(12) United States Patent
Kanouda et al.

(10) Patent No.: US 7,800,354 B2
(45) Date of Patent: Sep. 21, 2010

(54) SWITCHING POWER SUPPLY

(75) Inventors: Akihiko Kanouda, Hitachinaka (JP); Kenichi Yokota, Yoshimi (JP)

(73) Assignee: Renesas Technology Corp., Tokyo (JP)

( * ) Notice: Subject to any disclaimer, the term of this patent is extended or adjusted under 35 U.S.C. 154(b) by 85 days.

(21) Appl. No.: 12/012,059

(22) Filed: Jan. 30, 2008

(65) Prior Publication Data
US 2008/0290846 A1 Nov. 27, 2008

(30) Foreign Application Priority Data
Feb. 26, 2007 (JP) .............................. 2007-044845

(51) Int. Cl.
*G05F 1/40* (2006.01)
(52) U.S. Cl. ...................... 323/285; 323/284
(58) Field of Classification Search ......... 323/282–286, 323/222, 351
See application file for complete search history.

(56) References Cited

U.S. PATENT DOCUMENTS

| 6,194,885 | B1* | 2/2001 | Oshima ....................... 323/285 |
| 6,781,352 | B2 | 8/2004 | Athari et al. |
| 7,068,016 | B2 | 6/2006 | Athari |
| 7,362,083 | B2* | 4/2008 | Scoones et al. ............. 323/286 |
| 7,579,819 | B1* | 8/2009 | Ling ......................... 323/285 |
| 2006/0103409 | A1 | 5/2006 | Shigeta et al. |

FOREIGN PATENT DOCUMENTS

| JP | 11-146637 A | 5/1999 |
| JP | 2001-339953 A | 12/2001 |
| JP | 2006510340 T | 3/2006 |
| JP | 2006513682 T | 4/2006 |
| JP | 2006136086 | 5/2006 |
| JP | 2006-211854 A | 8/2006 |

OTHER PUBLICATIONS

IOR International Rectifier, The Power Management Leader, AC-DC [IR1150, 75W, 4KW, Mar. 2005.
www.irf.com, International IOR Rectifier, One Cycle Control PFC IC, Data Sheet No. PD60230, pp. 1-14.
Japan Patent Office (JPO) office action for JPO patent application JP2007-044845 (Feb. 9, 2009).

* cited by examiner

*Primary Examiner*—Jessica Han
(74) *Attorney, Agent, or Firm*—Townsend and Townsend and Crew LLP

(57) ABSTRACT

A switching power supply capable of correcting a power factor without using a shunt resistor is provided. The switching power supply includes a rectifier for rectifying an AC power supply, boosting means including a power MOSFET for boosting an output of the rectifier, a smoothing capacitor for smoothing an output of the boosting means, voltage-dividing resistors for detecting a voltage between main terminals of the power MOSFET, a switch for selecting only the voltage by which the power MOSFET is in on-state from voltages detected by the voltage-dividing resistors, an amplifier for amplifying the voltage selected by the switch and outputting the same as a current corresponding value of a current flowing in the power MOSFET, voltage-dividing resistors for detecting the output voltage, and driving means which form a pulse signal based on the current corresponding value and the output voltage for driving the power MOSFET by the pulse signal.

6 Claims, 11 Drawing Sheets

SWITCHING POWER SUPPLY

CROSS-REFERENCE TO RELATED APPLICATION

The present application claims priority from Japanese Patent Application No. JP 2007-044845 filed on Feb. 26, 2007, the content of which is hereby incorporated by reference into this application.

TECHNICAL FIELD OF THE INVENTION

The present invention relates to a switching power supply. More particularly, the present invention relates to a technique effectively applied to power factor correction of an alternating input current.

BACKGROUND OF THE INVENTION

To perform rectification and smoothing to obtain a direct current from an AC power supply, a configuration using a diode bridge and a smoothing capacitor is simplest. Meanwhile, since this configuration results in a rectifier circuit of so-called capacitor input type in which an input current flows only when whose power supply voltage is near the peak, which causes a lowering of power factor or an increase of input harmonic. Since the matter of input harmonic current is regulated by international standards, countermeasures according to the input power have been required.

With respect to this trend, as a switching power supply, various converters including one called power factor correction (PFC) converter or high power factor converter having a corrected power factor have been proposed.

Recently, in the field of electric home appliance or information equipment, a trend requiring cost reduction of this PFC converter has been pronounced, and an effort for reduction in the number of pins of a PFC control IC or reduction in the number of parts of the converter has been made.

As an example of this trend, there are Japanese Patent Application Laid-Open Publication No. 2006-510340 (Patent Document 1 of International Rectifier Corporation) and a control IC of International Rectifier Corporation IR1150 (IR1150 Data Sheet (2005) and the Power Factor Correction control IC of AC-DC converter: µPFC IC "IR1150" series of International Rectifier Corporation (Non-Patent Documents 1 and 2)). These proposals are intended to omit outside parts and achieve low loss and generally do not require sensing (or detecting) an input voltage waveform, which is required for performing the PFC control, into the control IC.

Here, with reference to FIG. 14, a circuit configuration of a conventional switching power supply will be explained. FIG. 14 is a circuit diagram showing a configuration of a conventional switching power supply, in which IR1150 which is a control IC of International Rectifier Corporation is used. Hereinafter, the configuration and operation of the circuit will be explained.

In FIG. 14, an AC power supply 1 gives an input voltage 4 via an input filter 2 and a rectifier 3 to have a full wave rectified waveform. Since the capacitance of a capacitor 12 is relatively small, a sinusoidal waveform is hardly smoothed. A series body of a coil 5, a power MOSFET 8, and a current-detecting resistor 16 is connected on the direct current side of the rectifier 3.

A series body of a boost diode 6 and a smoothing capacitor 9 is connected between the drain and source of the power MOSFET 8. Not only voltage-dividing resistors 11e, 11f but a load 10 is connected on both sides of the smoothing capacitor 9. The voltage of the smoothing capacitor 9 is called output voltage 7. An output-voltage-sense signal 14 is outputted from the middle point of the voltage-dividing resistors 11e and 11f, and inputted to a control circuit 20 mounted as a control IC.

Inside the control circuit 20, the output-voltage-sense signal 14 is subtracted from an output-voltage-command value Vref, and the error obtained by the subtraction is inputted to an amplifier 23 to be subjected to error amplification. The output from the amplifier 23 is inputted to a reset integrator 29, and an output from the current-detecting-resistor 16 is subtracted from the amplified output, and the output after subtraction is inputted to the − (negative) terminal of a comparator 25.

The output of the reset integrator 29 is inputted to the + (positive) terminal of the comparator 25 to be compared with the input value of the − terminal. The output of the comparator 25 is inputted to the reset of a flip-flop circuit 27. A clock 26 is inputted to the set of the flip-flop circuit 27. The Q output of the flip-flop circuit 27 is connected to a driver 17 outside the control circuit 20.

The output of the driver 17 is connected to the gate of the power MOSFET 8. The Q bar output of the flip-flop circuit 27 is connected to the reset switch of the reset integrator 29.

In this circuit configuration, according to changes of a voltage feedback value and a current detecting value, control of changing a pulse width for each cycle is adopted. As a result, even if sensor of an input voltage waveform is omitted, the current of the coil 5 has a substantially sinusoidal waveform synchronizing with an input voltage.

SUMMARY OF THE INVENTION

However, since a current-detecting resistor (hereinafter, it is called "shunt resistor") is used in the conventional switching power supply, there are problems that a cost of this shunt resistor and a loss due to the shunt resistor occur.

In addition, there is a problem that the design of a power GND line on a low potential side of a switching device for connecting the shunt resistor is limited.

Therefore, an object of the present invention is to provide a switching power supply capable of correcting a power factor without using a shunt resistor.

The above and other objects and novel characteristics of the present invention will be apparent from the description of this specification and the accompanying drawings.

The typical ones of the inventions disclosed in this application will be briefly described as follows.

A switching power supply according to the present invention comprises: rectifying means for rectifying an AC power supply; boosting means including a switching device for boosting an output of the rectifying means; smoothing means for smoothing an output of the boosting means; first voltage detecting means for detecting a voltage between main terminals of the switching device; selecting means for selecting only a voltage by which the switching device is put in an on-state among voltages detected by the first voltage detecting means; amplifying means for amplifying the voltage selected by the selecting means and outputting the same as a current corresponding value of a current flowing in the switching device, second voltage detecting means for detecting an output voltage of the smoothing means; and driving means which form a pulse signal based on the current corresponding value and the output voltage for driving the switching device by the pulse signal.

Further, a switching power supply according to the present invention comprises: rectifying means for rectifying an AC power supply; a plurality of boosting means including switching devices for boosting an output of the rectifying means; smoothing means for smoothing outputs of the plurality of boosting means; a plurality of first voltage detecting means for detecting voltages between main terminals of the respective switching devices of the plurality of boosting means; a plurality of selecting means for selecting only a voltage by which the switching device to be detected is in an on-state among respective voltages detected by the plurality of first voltage detecting means; a plurality of amplifying means for amplifying the respective voltages selected by the plurality of selecting means and outputting the voltages as current corresponding values corresponding to currents flowing in the switching devices; second voltage detecting means for detecting an output voltage of the smoothing means; and driving means which form pulse signals to the plurality of switching devices based on the current corresponding values and the output voltage for driving the plurality of switching devices by the pulse signals.

The effects obtained by typical aspects of the present invention will be briefly described below.

According to the present invention, an input current can be controlled to a substantially sinusoidal waveform without using a shunt resistor. As well as a cost-reducing effect given by elimination of a current-detecting resistor, an effect of reducing loss caused by a current-detecting resistor is achieved.

Further, according to the present invention, since a shunt resistor does not intervene on a power GND line of a primary side circuit from the DC low potential side of the rectifying means via the low potential side of the switching device, a design taking large space for a power GND becomes easy, which results in simplification of a power GND pattern of a substrate, noise suppression and therefore improvement in reliability of a circuit.

Further, according to the present invention, regarding the switching device, the fact that there is no current-detecting resistor on the low potential side enables stabilization of a gate voltage and suppression of malfunctions due to noise.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

In the present invention, to reduce current-detecting resistors of a PFC converter, a technique of detecting an ON-voltage of a switching device with a minimal configuration of parts without increasing the number of the other power parts is realized.

First Embodiment

Figure 1:
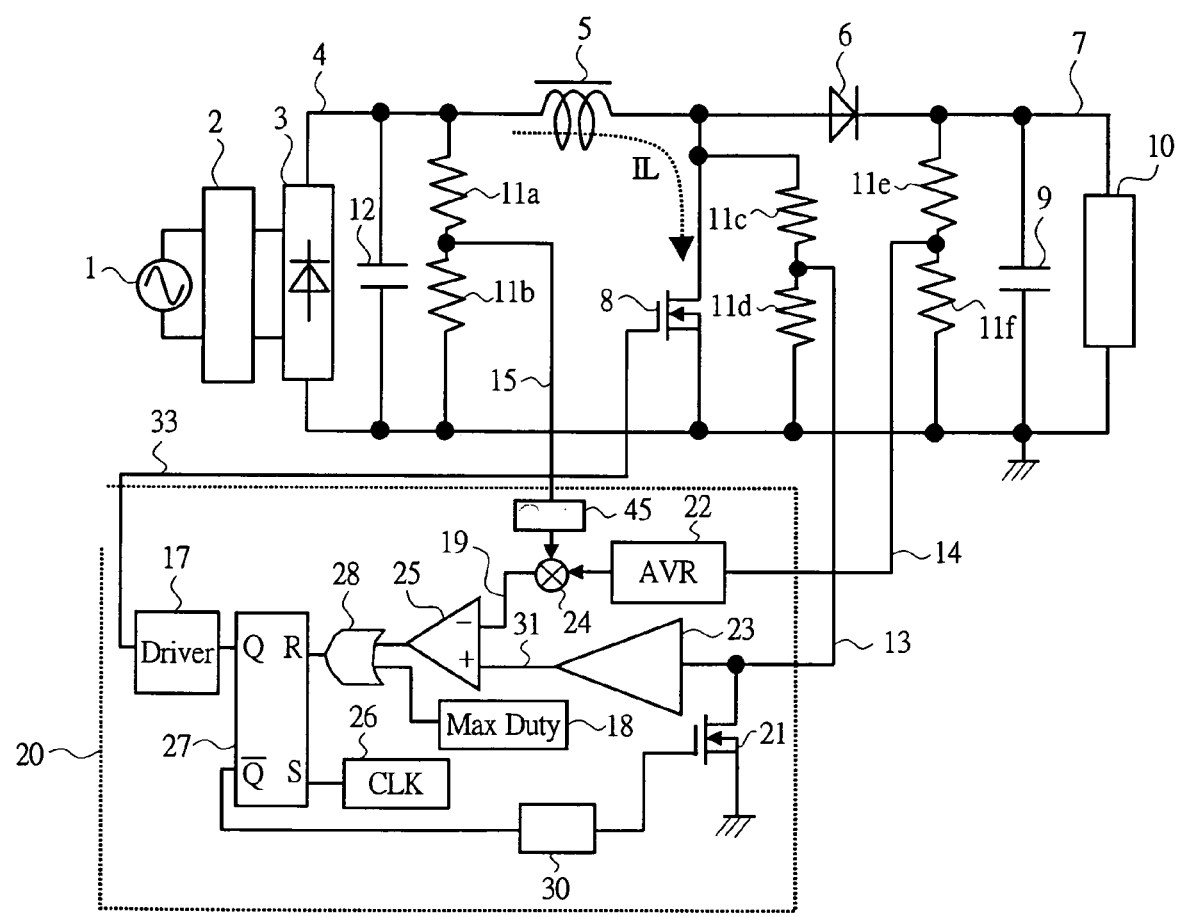
FIG. 1 is a circuit diagram showing a configuration of a switching power supply according to a first embodiment of the present invention.

With reference to FIG. 1, a configuration of a switching power supply according to a first embodiment of the present invention will be described. FIG. 1 is a circuit diagram showing the configuration of the switching power supply according to the first embodiment of the present invention, showing a circuit diagram of a PFC converter as a switching power supply.

In FIG. 1, the switching power supply comprises: an input filter 2; a rectifier 3; a coil 5; a boost diode 6; a power MOSFET 8; a smoothing capacitor 9; voltage-dividing resistors 11a to 11h, a capacitor 12, and a control circuit 20.

The control circuit 20 comprises: a driver 17; a maximum Duty circuit 18; a switch 21; an output voltage regulator 22; an amplifier 23; a multiplier 24; a comparator 25; a clock 26; a flip-flop circuit 27; an OR circuit 28; and a delay circuit 30.

An AC power supply 1 is changed to an input voltage 4 via the input filter 2 and the rectifier 3 which is rectifying means to have a full wave rectification waveform. Since the capacitance of the capacitor 12 is relatively small, a sinusoidal waveform is hardly smoothed. As well as the voltage-dividing resistors 11a and 11b, the coil 5 which is boosting means and the power MOSFET 8 which is a switching device is connected in series on the direct current side of the rectifier 3. The voltage-dividing resistors 11c and 11d which serve as first voltage detecting means are connected between the drain and source of the power MOSFET 8. The boost diode 6 and the smoothing capacitor 9 which is smoothing means are connected in series between the drain and source of the power MOSFET 8.

As well as the voltage-dividing resistors 11e and 11f which serve as second voltage detecting means, a load 10 is connected on both sides of the smoothing capacitor 9. The voltage of the smoothing capacitor 9 is called output voltage 7. An input voltage sense signal 15 is outputted from the middle point of the voltage-dividing resistors 11*a* and 11*b*, and inputted to the control circuit 20.

An output voltage sense signal 14 is outputted from the middle point of the voltage-dividing resistors 11*e*, 11*f*, and inputted to the control circuit 20. The GND potential of the control circuit 20 is the same potential as a source potential of the power MOSFET 8. Inside the control circuit 20, the output voltage sense signal 14 is inputted to the output voltage regulator 22.

The output of the output voltage regulator 22 is inputted to the multiplier 24. Similarly, the input voltage sense signal 15 is inputted to the multiplier 24 via a gain 45. The output of the multiplier 24 is inputted to the comparator 25 as a peak current command value 19. On the other hand, the device voltage sense signal 13 is grounded via the switch 21 which is selecting means.

The device voltage sense signal 13 is inputted to the amplifier 23 which is amplifying means. The output of the amplifier 23 is inputted to the comparator 25 as a current corresponding value 31. The output of the comparator 25 is inputted to the OR circuit 28. Further, the output of the maximum Duty circuit 18 is inputted to the OR circuit 28. The output of the OR circuit 28 is inputted to the reset of the flip-flop circuit 27. The clock 26 is inputted to the set of the flip-flop circuit 27. The Q output of the flip-flop circuit 27 is connected to the driver 17.

The output of the driver 17 is connected to the gate of the power MOSFET 8 as a drive signal 33. The Q bar output of the flip-flop circuit 27 is connected to the gate of the switch 21 via the delay circuit 30.

The comparator 25, the maximum Duty circuit 18, the clock 26, the flip-flop circuit 27, and the driver 17 constitute driving means.

Figure 2:
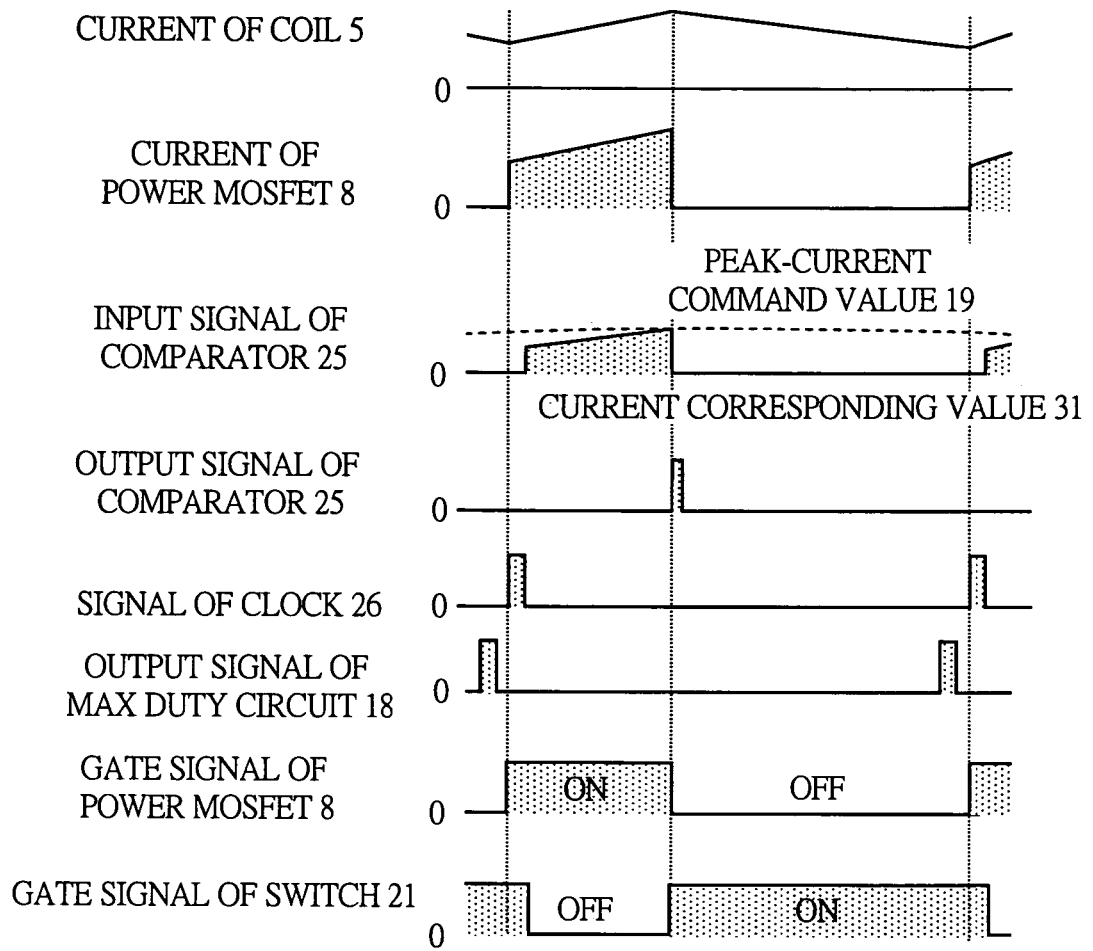
FIG. 2 is a diagram showing waveforms of respective parts in operation of the switching power supply according to the first embodiment of the present invention.
Figure 2:
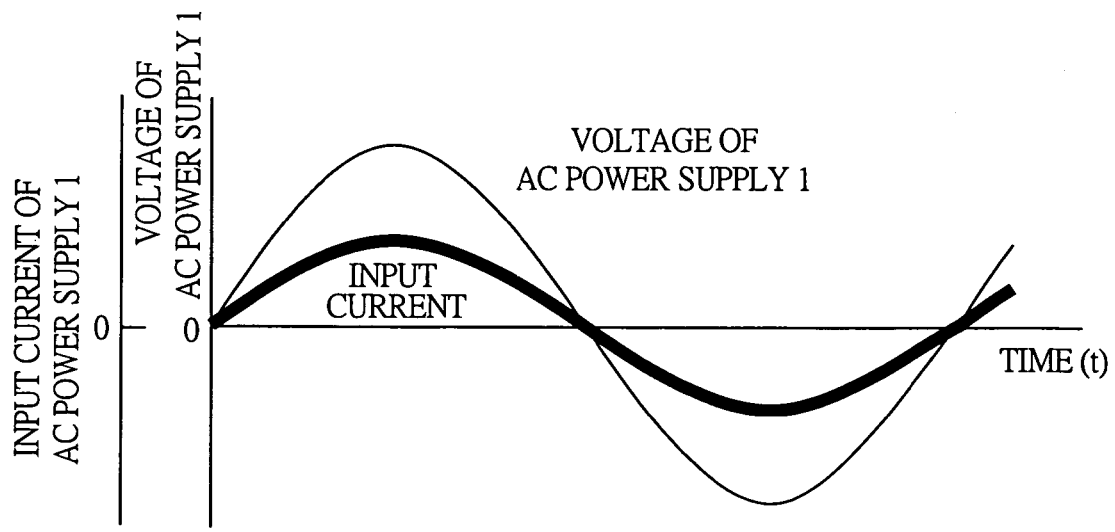
Figure 3:
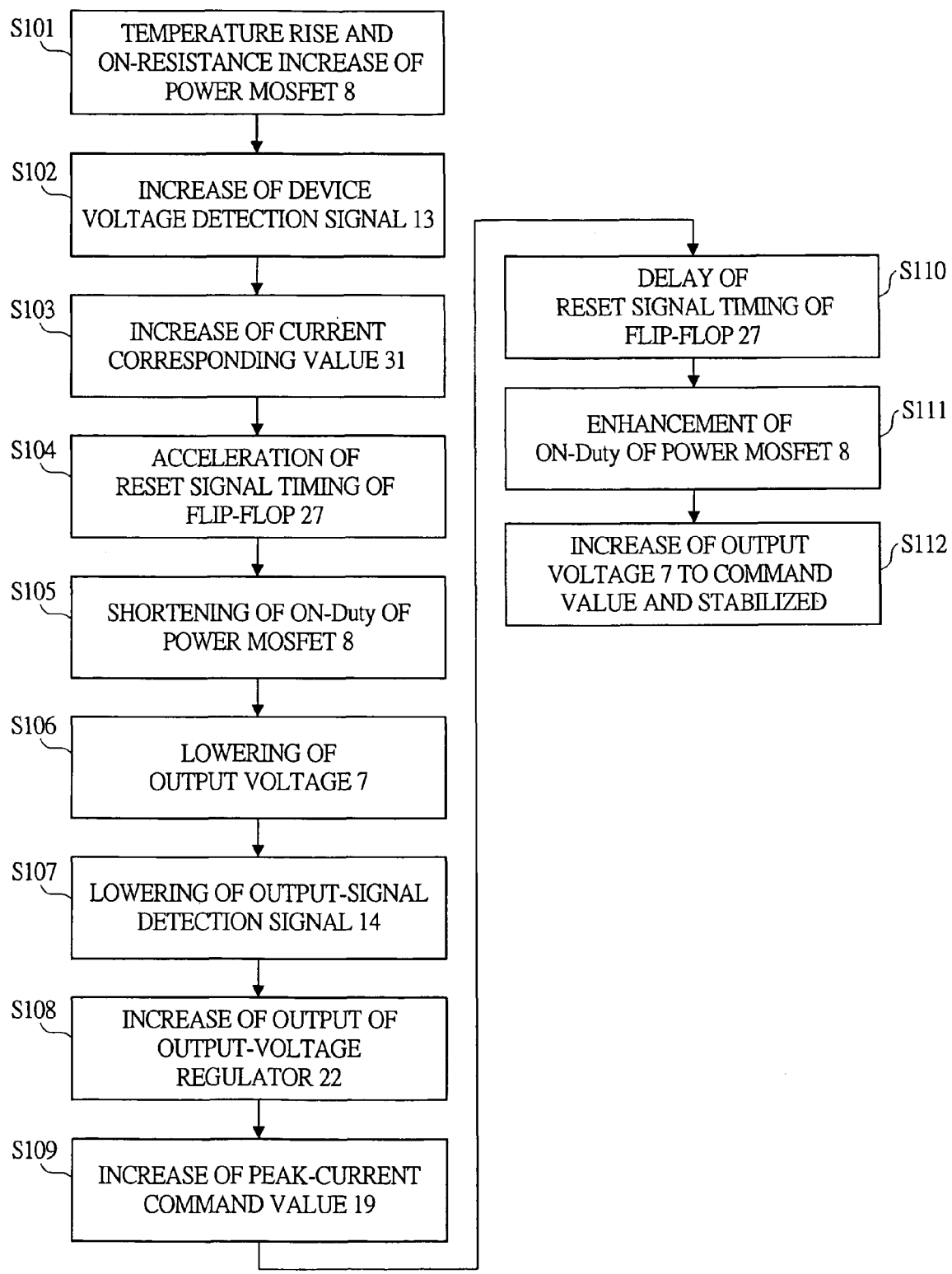
FIG. 3 is a flowchart showing a temperature compensating operation of the switching power supply according to the first embodiment of the present invention.

Next, with reference to FIG. 1 to FIG. 3, an operation of the switching power supply according to the first embodiment of the present invention will be described. FIG. 2 is a diagram showing waveforms of respective parts of the switching power supply in operation according to the first embodiment of the present invention, and FIG. 3 is a flowchart showing a temperature compensating operation of the switching power supply according to the first embodiment of the present invention.

In FIG. 1, an AC power inputted from the AC power supply 1 becomes the input voltage 4 having a full-wave rectification waveform via the input filter 2 and the rectifier 3. The input voltage 4 is short-circuited via a route of the coil 5 and the power MOSFET 8 when the power MOSFET 8 turns on, and stored as excitation energy in the coil 5.

The excitation energy of the coil 5 is discharged to the smoothing capacitor 9 via the boost diode 6 when the power MOSFET 8 turns off. And, by repeating this operation, a so-called boosting operation where the output voltage 7 become higher than the input voltage 4 is performed.

Also in the present embodiment, as with the example of a conventional power factor correction (PFC) converter, this boosting operation is utilized to perform waveform control of an input current from the AC power supply 1 to a sinusoidal waveform in the same phase as the AC power supply 1. At the same time, the output voltage 7 is controlled to a constant voltage (for example, DC 380 V).

In the present embodiment, a current flowing in the circuit is measured without using such a shunt resistor as used in the conventional technique to perform peak current control. A drain source voltage of the power MOSFET 8 is divided at the voltage-dividing resistors 11*c* and 11*d*, and inputted to the amplifier 23 in the control circuit 20 as the device voltage sense signal 13. At this time, due to the flip-flop circuit 27 and the delay circuit 30, the timing of the gate waveform of the power MOSFET 8 and the timing of the gate waveform of the switch 21 become those as shown in FIG. 2.

Accordingly, the switch 21 is ON when the power MOSFET 8 is OFF, and the device voltage sense signal 13 is grounded and becomes zero. When a short amount of time set in advance by the delay circuit 30 has passed since the power MOSFET 8 turned ON, the switch 21 turns OFF and the grounding of the device voltage sense signal 13 is released. Providing the short amount of time utilizing the delay circuit 30 is for preventing the current detecting system from receiving noise caused by di/dt at the turn-on time of the power MOSFET 8.

As a result, when the ON resistance of the power MOSFET 8 is represented by Ron, the voltage-dividing resistors 11*c* and 11*d* are represented by R11*c* and R11*d*, respectively, a current flowing in the power MOSFET 8 is represented by IL, and the device voltage sense signal 13 is represented by Vsns, Vsns is a voltage represented by the following equation.

$$Vsns = IL \times Ron \times R11d/(R11c+R11d)$$

Vsns is amplified by the amplifier 23, so that the quantity of state proportional to the flowing current IL can be obtained as a current corresponding value 31.

In FIG. 2, the correlation among the current of the coil 5, the current of the power MOSFET 8 and the current corresponding value 31 are shown. Though the current corresponding value 31 is cut with respect to the current of the power MOSFET 8 at the turn-on time by the short amount of time set by the delay circuit 30, thereafter, the current corresponding value 31 has a proportional waveform.

On the other hand, the output voltage 7 is taken into the control circuit 20 as the output-voltage-sense signal 14, subjected to error amplification by the output voltage regulator 22 with respect to a voltage instruction value which the output voltage regulator 22 has inside, and outputted to the multiplier 24. Further, the input voltage 4 is taken into the control circuit 20 as the input voltage sense signal 15, the gain 45 is added to the input voltage 4 and then the input voltage 4 is inputted to the multiplier 24, the input voltage 4 is multiplied by the output of the output voltage regulator 22, and this result becomes the peak current command value 19.

The peak current command value 19 has a waveform obtained by a full-wave rectification of the sinusoidal waveform of the AC power supply 1, and the crest value thereof depends on the output of the output voltage regulator 22. The peak current command value 19 is inputted to the comparator 25 so as to be compared with the current corresponding value 31.

In FIG. 2, a relationship between the peak current command value 19 and the current corresponding value 31 is shown. When the current corresponding value 31 increases up to the same value as the peak current command value 19 indicated by the broken line, the output of the comparator 25 inverts from Low, which is the previous state, to High. This signal is inputted to the OR circuit 28.

A signal from the maximum Duty circuit 18 is also inputted to the OR circuit 28. As shown in FIG. 2, the earlier pulse of the output pulse of the maximum Duty circuit 18 and the output pulse of the comparator 25 becomes effective, and the timing of the earlier pulse is inputted to the reset terminal of the flip-flop circuit 27. In the steady state, the output pulse of the comparator 25 is outputted earlier than the output pulse of the maximum Duty circuit 18, so that a reset signal of the flip-flop circuit 27 enters at the time point when the current corresponding value 31 corresponds to the peak current command value 19, and the Q output of the flip-flop circuit 27 turns to Low.

More particularly, the drive signal 33 of the power MOSFET 8 turns off, and the power MOSFET 8 turns off. The Q bar turns to High at the same time as the Q of the flip-flop circuit 27 turns to Low. Since the delay circuit 30 performs delay only at the changing time from High to Low, and does not perform delay at the changing time from Low to High, the gate of the switch 21 becomes High at the same time as the Q turns to Low, and the switch 21 turns on. Since the driver 17 is interposed, the power MOSFET 8 turns off delayed after the switch 21 turns on.

As a result, the amplifier 23 is never affected by surging of the drain voltage at the turn-off time of the power MOSFET 8.

As shown in FIG. 2, the clock 26 outputs a pulse at a constant time interval. The power MOSFET 8 turns on according the flip-flop circuit 27 set by the clock 26. As a result, the power MOSFET 8 turns on at a constant cycle, and turns off at a peak current of a crest value depending on the output voltage regulator 22.

The current of the coil 5 has a saw-tooth wave in which the maximum value is at the turn-off time of the power MOSFET 8 as shown in FIG. 2, and the rough shape thereof is a shape similar to a waveform obtained by rectifying the voltage waveform of the AC power supply 1.

It has been known that the ON resistance of the power MOSFET is large in temperature dependence. At the operating time of the circuit shown in FIG. 1, it is easily predicted that the temperature of a chip increases due to joule heat and a switching loss caused by the current flowing into the power MOSFET 8, and accordingly, the ON resistance increases.

At this time, the behavior shown in FIG. 3 is shown.

More particularly, when the ON resistance increases due to temperature increase of the power MOSFET 8 (S101), the device voltage sense signal 13 proportionally increases (S102), and the current corresponding value 31 increases (S103).

The fact that the current corresponding value 31 increases with respect to the peak current command value 19 which is a reference that the reset timing of the flip-flop circuit 27 is accelerated as compared to the low temperature time (S104). Duty of the power MOSFET 8 is shortened (S105), and the DC component of the current of the coil 5 decreases. As a result, the output voltage 7 lowers (S106), so that the output voltage sense signal 14 lowers (S107), and the output of the output voltage regulator 22 increases (S108).

Due to the operation of the output voltage regulator 22, the peak current command value 19 increases (S109), the reset timing of the flip-flop circuit 27, which has been on a shortening trend, is again postponed (S110), so that Duty of the power MOSFET 8 is enhanced (S111), and the current of the coil 5 increases, thereby rising the output voltage 7 (S112).

As described above, in the configuration of the present embodiment having a current minor loop and a voltage major loop, absolute accuracy of the ON resistance of the power MOSFET 8 used for current detection is not required, and the voltage is kept constant by a voltage major control system.

Since it can be considered that the time constant of the temperature change of the power MOSFET 8 is sufficiently large with respect to one cycle (50 Hz: 20 ms, 60 Hz: 16.7 ms) of a commercial frequency wave, the temperature of the power MOSFET 8 can be considered to be substantially constant in one cycle of such a sinusoidal waveform as shown in FIG. 2. Therefore, even considering the temperature change of the ON resistance of the power MOSFET 8, such an input current having high power factor as shown in FIG. 2 can be obtained.

In this manner, in the present embodiment, the input current can be controlled to such a substantially sinusoidal waveform as shown in FIG. 2 without using such a current-detecting resistor (shunt resistor) as with the conventional configuration. Therefore, by adopting the configuration of the present invention, a cost reducing effect due to elimination of the current detection resistor or an effect of reducing a loss caused by the current-detecting resistor are achieved.

Figure 14:
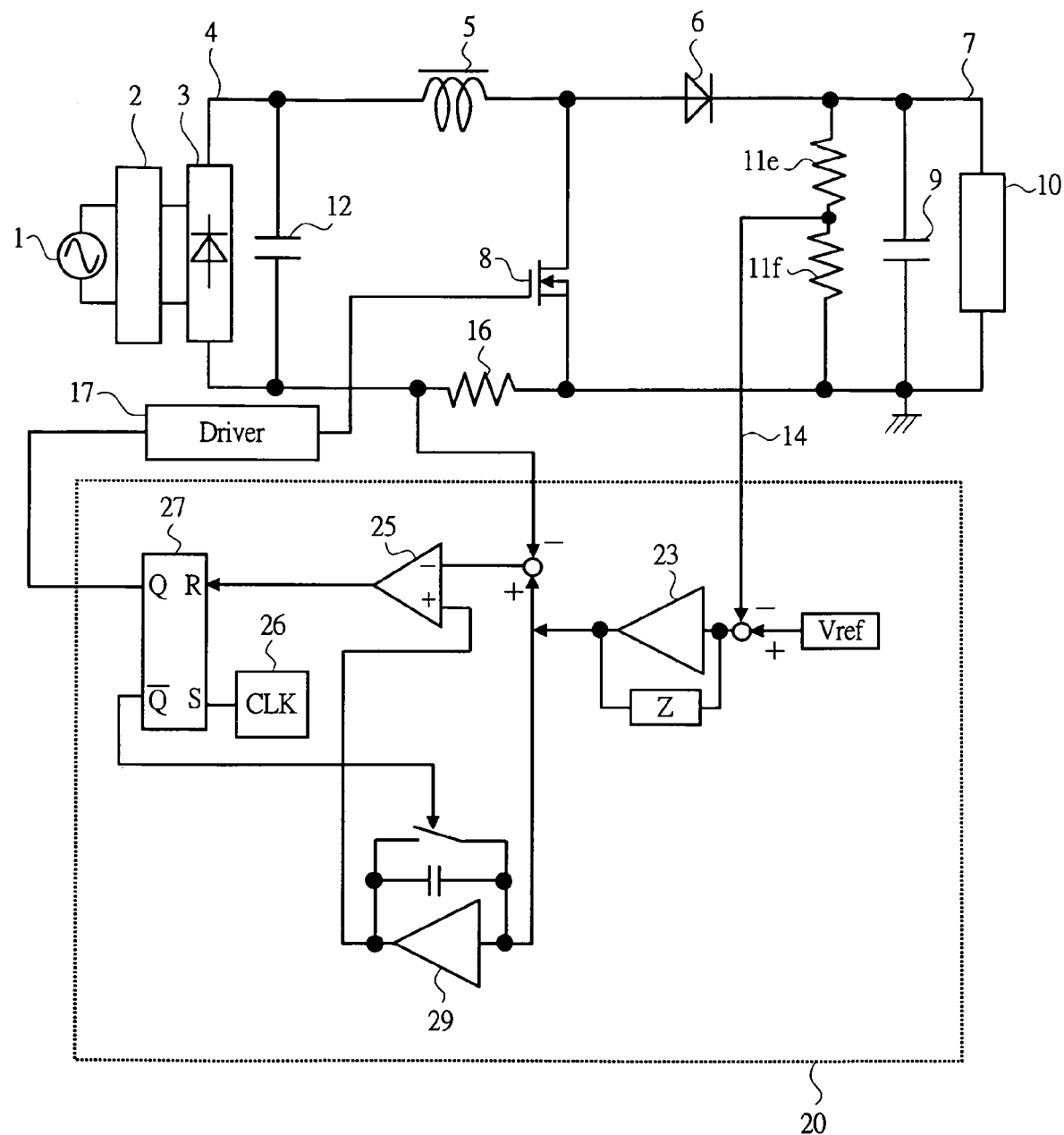
FIG. 14 is a circuit diagram showing a configuration of a conventional switching power supply.

Further, when FIG. 1 is compared with FIG. 14, a current-detecting resistor does not intervene on a power GND line from the direct current low potential side of the rectifier 3 to the GND of the smoothing capacitor 9 via the source of the power MOSFET 8, so that the design making large space for a power GND becomes easy.

Such a fact shows that the present invention is effective in simplifying a power GND pattern of a substrate, inhibiting noise, and therefore, improving reliability of a circuit. Regarding the power MOSFET 8, the fact that there is no current-detecting resistor on the source side also brings stabilization of the gate voltage and an effect of inhibiting malfunction caused by noise.

Note that, in the present embodiment, as a switching device to replace the power MOSFET, a power switching device in which an ON voltage rises in substantially proportion to a flowing current can be used. An SiC device developed for low loss also is an candidate for the switching device.

Further, in the present embodiment, since the load 10 can be an isolated DC/DC converter, the load 10 is integrated with the boost power factor correction converter shown in the figures, thereby providing a switching power supply with a power factor correcting function.

Second Embodiment

Figure 4:
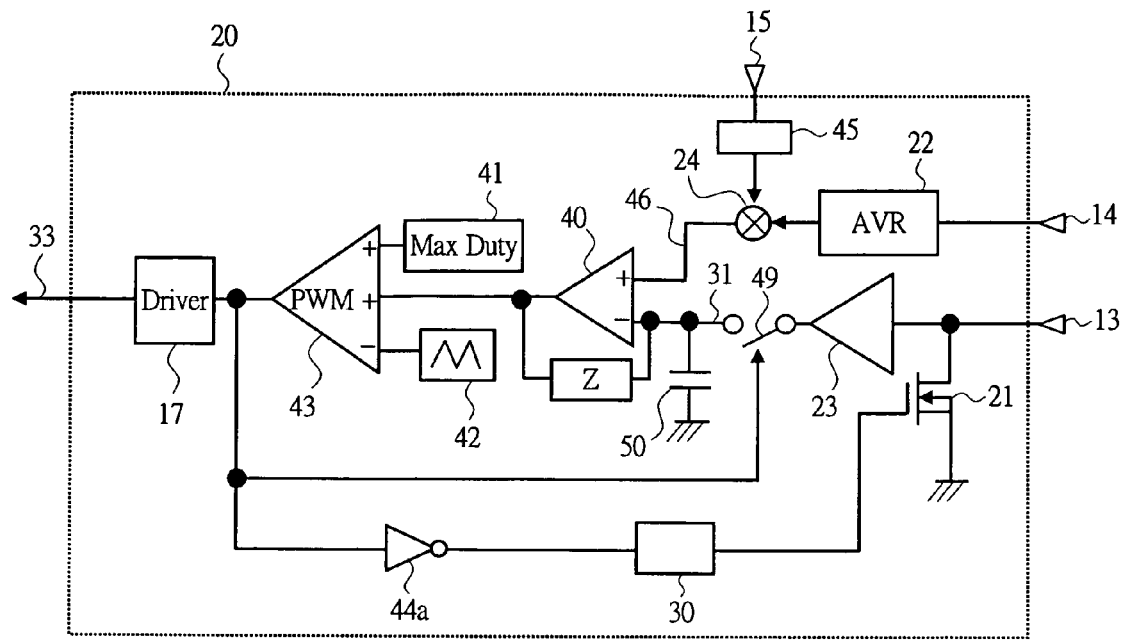
FIG. 4 is a circuit diagram showing a configuration of a control circuit of a switching power supply according to a second embodiment of the present invention.

Next, with reference to FIG. 1 and FIG. 4, a configuration of a switching power supply according to a second embodiment of the present invention will be described. FIG. 4 is a circuit diagram showing a configuration of a control circuit of the switching power supply according to the second embodiment of the present invention.

In the switching power supply of the present embodiment, the control circuit 20 of the switching power supply according to the first embodiment shown in FIG. 1 is replaced with the control circuit 20 shown in FIG. 4.

The control circuit 20 shown in FIG. 4 has a function similar to that of the control circuit 20 of the circuit diagram shown in FIG. 1, and the control circuit 20 in FIG. 4 operates in combination with a main circuit in FIG. 1 by replacing the control circuit in FIG. 1 with the control circuit 20 in FIG. 4. In FIG. 4, parts and blocks having the same functions as in FIG. 1 are applied with the same reference numerals.

Inside the control circuit 20, the output voltage sense signal 14 is inputted to the output voltage regulator 22. The output of the output voltage regulator 22 is inputted to the multiplier 24. Similarly, the input voltage sense signal 15 is inputted to the multiplier 24 via the gain 45.

The output of the multiplier 24 is inputted to the amplifier 40 as an average current command value 46. On the other hand, the device voltage sense signal 13 is grounded via the switch 21.

The device voltage sense signal 13 is inputted to the amplifier 23. The output of the amplifier 23 is inputted to the amplifier 40 as the current corresponding value 31 via a switch 49. A capacitor 50 is connected between the node of the current corresponding value 31 and the GND. The output of the amplifier 40 is inputted to a PWM comparator 43.

Further, an output of a maximum Duty setting circuit 41 and an output of a triangle wave generator 42 are inputted to the PWM comparator 43. The output of the PWM comparator 43 is connected to the control terminal of the switch 49, as well as being inputted to the driver 17.

The output of the driver 17 is outputted as a drive signal 33 and connected to the gate of the power MOSFET 8 in FIG. 1. The output of the PWM comparator 43 is connected to the gate of the switch 21 via a NOT circuit 44a and the delay circuit 30.

Next, with reference to FIG. 1 and FIG. 4, the operation of the switching power supply according to the second embodiment of the present invention will be described.

In the present embodiment, as is the case with the conventional PFC converter, by switching the power MOSFET 8, the boosting operation is utilized to waveform-control the input current from AC power supply 1 to a sinusoidal waveform in the same phase as the AC power supply 1 with controlling the output voltage 7 to a constant voltage (for example, DC 380 V) at the same time.

In the present embodiment, a current to flow in the circuit is measured without using such a shunt resistor as used in the conventional technique to perform average value current control.

The drain source voltage of the power MOSFET 8 is divided by the voltage-dividing resistors 11c and 11d to be inputted to the amplifier 23 in the control circuit 20 in FIG. 4 as the device voltage sense signal 13. At this time, due to the PWM comparator 43 and the NOT circuit 44a, and the delay circuit 30, the switch 21 is ON when the power MOSFET 8 is OFF, and the device voltage sense signal 13 is grounded to become zero.

When a short amount of time set in advance by the delay circuit 30 has passed since the power MOSFET 8 turned ON, the switch 21 turns OFF, and the grounding of the device voltage sense signal 13 is released. Providing the short amount of time utilizing the delay circuit 30 is for preventing the current detecting system from receiving noise caused by di/dt at the turn-on time of the power MOSFET 8.

As the result, when the ON resistance of the power MOSFET 8 is represented by Ron, the voltage-dividing resistors 11c and 11d are represented by R11c and R11d, respectively, a current flowing in the power MOSFET 8 is represented by IL, and the device voltage sense signal 13 is represented by Vsns, Vsns is a voltage represented by the following equation.

$$Vsns = IL \times Ron \times R11d/(R11c+R11d)$$

Vsns is amplified by the amplifier 23, thereby, the quantity of state proportional to the flowing current IL can be obtained as the current corresponding value 31.

Further, since the switch 49 turns off according to the operation of the PWM comparator 43 when the power MOSFET 8 if off, the current corresponding value 31 is kept at the value of the current corresponding value 31 when the power MOSFET 8 is on in the capacitor 50, and the value is retained.

While the turn-on time of the current corresponding value 31 is cut by the short amount of time set by the delay circuit 30 with respect to the current of the power MOSFET 8, the current corresponding value 31 thereafter has a proportional waveform. On the other hand, the output voltage 7 is taken into the control circuit 20 as the output voltage sense signal 14, subjected to error amplification by the output voltage regulator 22 with respect to a voltage instruction value the output voltage regulator 22 has inside, and outputted to the multiplier 24.

Further, the input voltage 4 is taken into the control circuit 20 as the input voltage sense signal 15, the gain 45 is added to the input voltage 4, the input voltage 4 is inputted to the multiplier 24 and multiplied by the output of the output voltage regulator 22, and this result becomes the average current command value 46. The average current command value 46 has a waveform obtained by full-wave-rectifying a sinusoidal waveform of the AC power supply 1, and the crest value thereof depends on the output of the output voltage regulator 22. The average current command value 46 is inputted to the amplifier 40 to be compared with the current corresponding value 31.

The comparison result is inputted to the PWM comparator 43. A signal from the maximum Duty setting circuit 41 and a triangle wave from the triangle wave generator 42 are also inputted to the PWM comparator 43. The output level of the maximum Duty setting circuit 41 and the output level of the amplifier 40 are compared with each other to output a PWM pulse having a pulse width set to MAX by the maximum Duty setting circuit 41.

Since the output level of the amplifier 40 is lower than the output level of the maximum Duty setting circuit 41 in a steady state, a PWM pulse corresponding to the output of the amplifier 40 is outputted. According to the output of the PWM comparator 43, the driver 17 operates to output the drive signal 33 of the power MOSFET 8. At the turn-off, the switch 49 turns off at the same time as the output of the PWM comparator 43 turns to Low.

Further, the output of the NOT circuit 44a is inverted from Low to High at the same time as the PWM comparator 43 turns to Low. At this time, since the delay circuit 30 performs delay only on the change from High to Low and does not perform delay on the change from Low to High, the gate of the switch 21 becomes High and the switch 21 turns on. The power MOSFET 8 turns off delayed after the switch 21 turns on because the driver 17 is interposed.

As a result, the amplifier 23 is never affected by surging of the drain voltage at the turn-off of the power MOSFET 8. The current of the coil 5 becomes a saw-tooth wave having the maximum value at the turn-off of the power MOSFET 8, and the rough shape thereof is a shape similar to a waveform obtained by rectifying the voltage waveform of the AC power supply 1.

As described above, also in the present embodiment, the input current can be controlled to a substantially sinusoidal waveform without using such a conventional current-detecting resistor (shunt resistor). Therefore, by adopting the configuration of the present embodiment, a cost reducing effect by elimination of the current detection resistor or an effect of reducing a loss caused by the current-detecting resistor are achieved. Besides, the present embodiment has effects similar to those described in the first embodiment.

Third Embodiment

Figure 5:
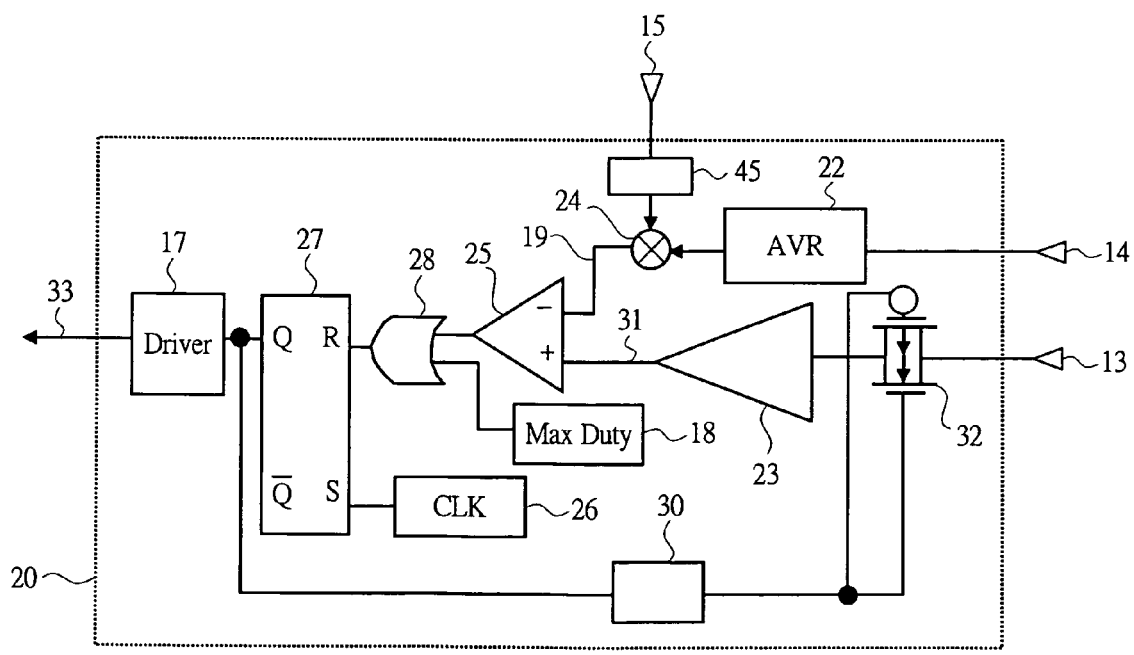
FIG. 5 is a circuit diagram showing a configuration of a control circuit of a switching power supply according to a third embodiment of the present invention.

Next, with reference to FIG. 1 and FIG. 5, a configuration of a switching power supply according to a third embodiment of the present invention will be described. FIG. 5 is a circuit diagram showing a configuration of a control circuit of the switching power supply according to the third embodiment of the present invention.

In the switching power supply of the present embodiment, the control circuit 20 of the switching power supply of the first embodiment shown in FIG. 1 is replaced with the control circuit 20 shown in FIG. 5.

The control circuit 20 shown in FIG. 5 has a function similar to the control circuit 20 of the circuit diagram shown in FIG. 1, and the control circuit 20 in FIG. 5 operates in combination with the main circuit in FIG. 1 by replacing the control circuit 20 in FIG. 1 with the control circuit 20 in FIG. 5. In FIG. 5, parts and blocks having the same functions as in FIG. 1 are applied with the same reference numerals.

In the control circuit 20 shown in FIG. 5, there is not the switch 21 of the control circuit 20 shown in FIG. 1, and instead, an analog switch 32 is connected between an input portion to the IC 20 of the device voltage sense signal 13 and the amplifier 23. A control terminal of the analog switch 32 is connected to the Q of the flip-flop circuit 27 via the delay circuit 30.

Figure 6:
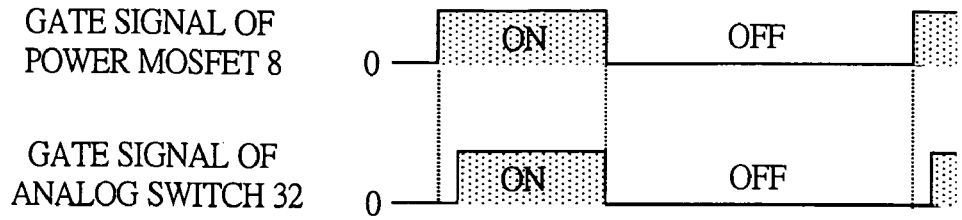
FIG. 6 is a diagram showing waveforms of respective parts of the switching power supply in operation according to the third embodiment of the present invention.

Next, with reference to FIG. 1, FIG. 5, and FIG. 6, the operation of the switching power supply according to the third embodiment of the present invention will be described. FIG. 6 is a diagram showing waveforms of respective portions during the operation of the switching power supply according to the third embodiment of the present invention.

In FIG. 5, the analog switch 32 is controlled by the flip-flop circuit 27 and the delay circuit 30.

As shown in FIG. 6, the analog switch 32 delays turning on later by the short amount of time due to the delay circuit 30 at the turn-on time of the power MOSFET 8.

Thereafter, the analog switch 32 is in its on-state when the power MOSFET 8 is on, and the device voltage sense signal 13 is inputted to the amplifier 23. The delay circuit 30 does not perform delay when the Q of the flip-flop circuit 27 turns from High to Low, so that the analog switch 32 turns off immediately.

Since the power MOSFET 8 turns off in response to a Low signal of the flip-flop circuit 27 via the driver 17, the power MOSFET 8 turns off after the turn-off of the analog switch 32.

As a result, the amplifier 23 is never affected by surging of the drain voltage at the turn-off time of the power MOSFET 8.

Since the other circuit operations of the present embodiment are similar to those of the first embodiment, the input current can be controlled to a substantially sinusoidal waveform without using such a conventional current-detecting resistor (shunt resistor).

Consequently, by adopting the configuration of the present embodiment, a cost reducing effect by elimination of the current detection resistor and an effect of reducing a loss caused by the current-detecting resistor are achieved. Besides, the present embodiment has effects similar to those described in the first embodiment.

Fourth Embodiment

Figure 7:
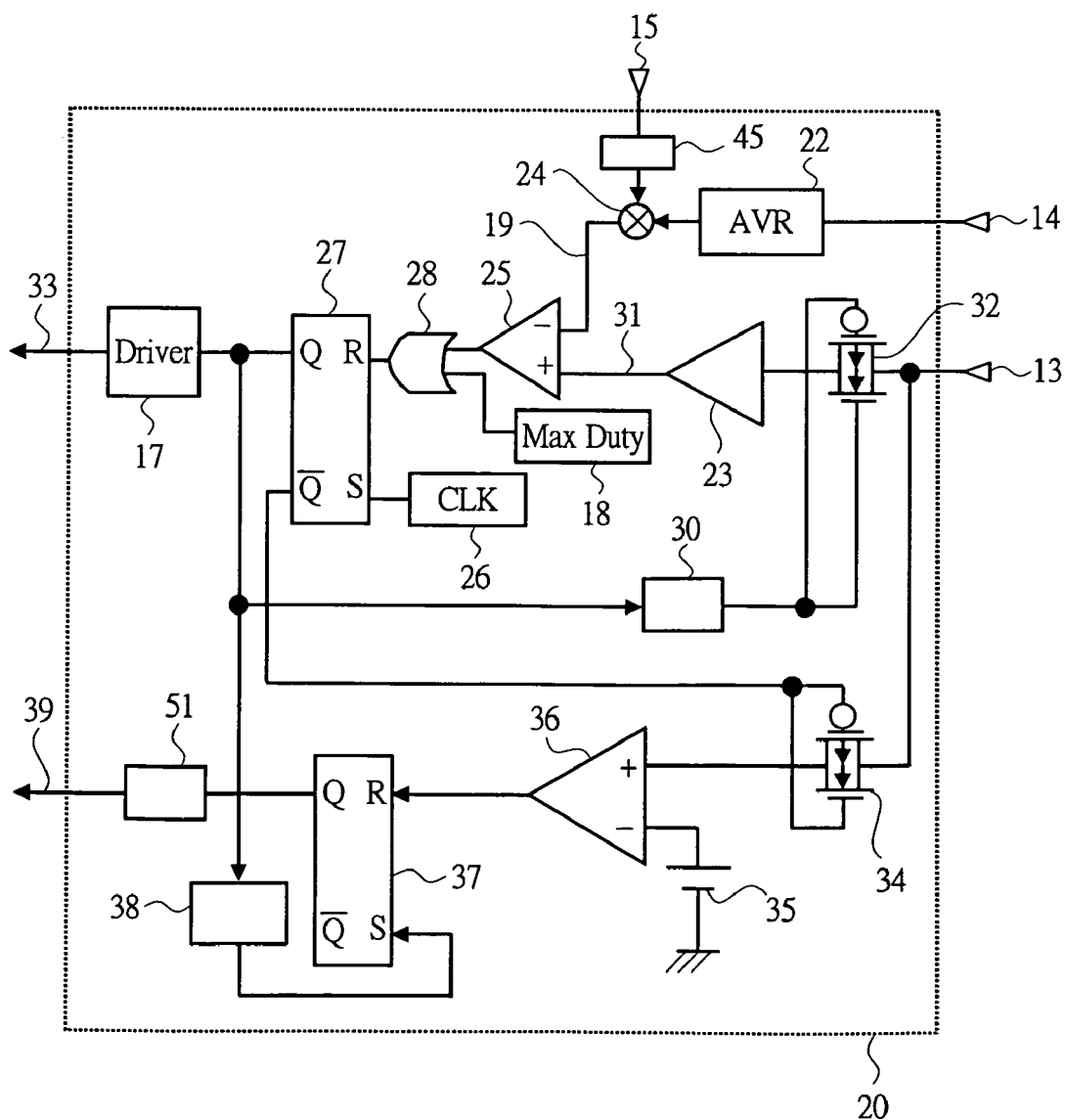
FIG. 7 is a circuit diagram showing a configuration of a control circuit of a switching power supply according to a fourth embodiment of the present invention.

Next, with reference to FIG. 1 and FIG. 7, a configuration of a switching power supply according to a fourth embodiment of the present invention will be described. FIG. 7 is a circuit diagram showing a configuration of a control circuit of the switching power supply according to the fourth embodiment of the present invention.

In the switching power supply of the present embodiment, the control circuit 20 of the switching power supply of the third embodiment shown in FIG. 5 is replaced with the control circuit 20 shown in FIG. 7 which is obtained by adding a short circuit detect circuit of the power MOSFET 8 to the control circuit 20 of the third embodiment.

In FIG. 7, the device voltage sense signal 13 is connected to the + input of a comparator 36 via the analog switch 34. The gate of the analog switch 34 is connected to the Q bar output of the flip-flop circuit 27. A reference voltage 35 is connected to the − input of the comparator 36. The output of the comparator 36 is inputted to the reset of a flip-flop circuit 37. The Q output of the flip-flop circuit 27 is inputted to the set of the flip-flop circuit 37 via a falling edge detect circuit 38. The Q output of the flip-flop circuit 37 is outputted to the outside of the control circuit 20, for example, to an upper device as a short circuit sense signal 39 via a filter 51. The other configurations are similar to those of the control circuit 20 of the third embodiment, and the basic operation of the switching power supply of the present embodiment is similar to that of the third embodiment.

Figure 8:
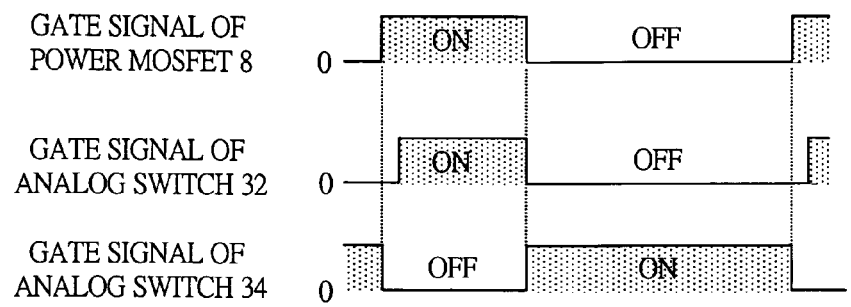
FIG. 8 is a diagram showing waveforms of respective parts of the switching power supply in operation according to the fourth embodiment of the present invention.

Next, with reference to FIG. 1, FIG. 7, and FIG. 8, the operation of the switching power supply according to the fourth embodiment of the present invention will be described. FIG. 8 is a diagram showing waveforms of respective parts during the operation of the switching power supply according to the fourth embodiment of the present invention.

The gate signal of the power MOSFET 8, the gate signal of the analog switch 32, and the gate signal of the analog switch 34 are as shown in FIG. 8, respectively.

The gate signal of the analog switch 34 is in opposite phase to the gate signal of the power MOSFET 8, the voltage the power MOSFET 8 is off is inputted to the + terminal of the comparator 36, and the + terminal of the comparator 36 becomes high impedance when the power MOSFET 8 is on.

When the power MOSFET 8 turns off, the Q output of the flip-flop circuit 27 is inverted from High to Low. In the falling edge detect circuit 38, a set signal is inputted to the flip-flop circuit 37 in response to this change, and the Q output of the flip-flop circuit 37 is inverted from Low to High.

At this time, due to turn-off of the power MOSFET 8, the voltage of the device voltage sense signal 13 rises rapidly from near zero to the output voltage 7. Since the analog switch 34 turns on at this time, a voltage value obtained by dividing the drain voltage of the power MOSFET 8 by the voltage-dividing resistors 11c and 11d (see FIG. 1) is applied to the + terminal of the comparator 36.

Since the reference voltage 35 sets the output voltage 7 to be sufficiently lower than the voltage divided by the voltage-dividing resistors 11c and 11d, the comparator 36 inverts from Low to High in response to turn-off of the power MOSFET 8, and the flip-flop circuit 37 is reset.

Therefore, at the turn-off, according to such an operation as described above, the Q output of the flip-flop circuit 37 which has once been inverted to High is immediately reset and turned to Low.

For this reason, this change of the Q output of the flip-flop circuit 37 is cut by the filter 51, and the short circuit sense signal 39 remains Low and does not change.

Here, it is assumed that a short-circuit fault occurs in the power MOSFET 8. If a complete short-circuit fault occurs in the power MOSFET 8, it can be thought that the current detection by the device voltage sense signal 13 becomes impossible, and the comparator 25 does not invert within a predetermined pulse width.

In this case, the flip-flop circuit 27 is reset at the output timing of the maximum Duty circuit 18, and an off signal is transmitted from the driver 17 to the power MOSFET 8. On the other hand, if the short-circuit fault occurs in the power MOSFET 8 having an impedance larger than that at the normal on-time, normal current detection by the device voltage sense signal 13 becomes impossible, and the comparator 25 inverts in a time shorter than the predetermined pulse width.

In both cases, even when the flip-flop circuit 27 is reset in the state where the power MOSFET 8 is put into a short-circuit state, the flip-flop circuit 37 is set by the falling edge detect circuit 38 of the Q output of the flip-flop circuit 27.

However, since the device voltage sense signal 13 does not rise up to the output voltage 7 due to the short circuit of the power MOSFET 8, the comparator 36 does not normally invert, and a reset signal does not enter the flip-flop circuit 37.

As a result, the flip-flop circuit 37 remains being set, and the Q output of the flip-flop circuit 37 maintains its High state, and the short circuit sense signal 39 is outputted.

As described above, while in the present embodiment, a conventional method of detecting short circuit of a power MOSFET cannot be used due to elimination of a shunt resistor, such a method as described above allows detecting the short circuit state of the power MOSFET at the first turn-off time after the short circuit occurs.

By using this method, high reliability can be secured as well as the effects described in the first embodiment.

Fifth Embodiment

Figure 9:
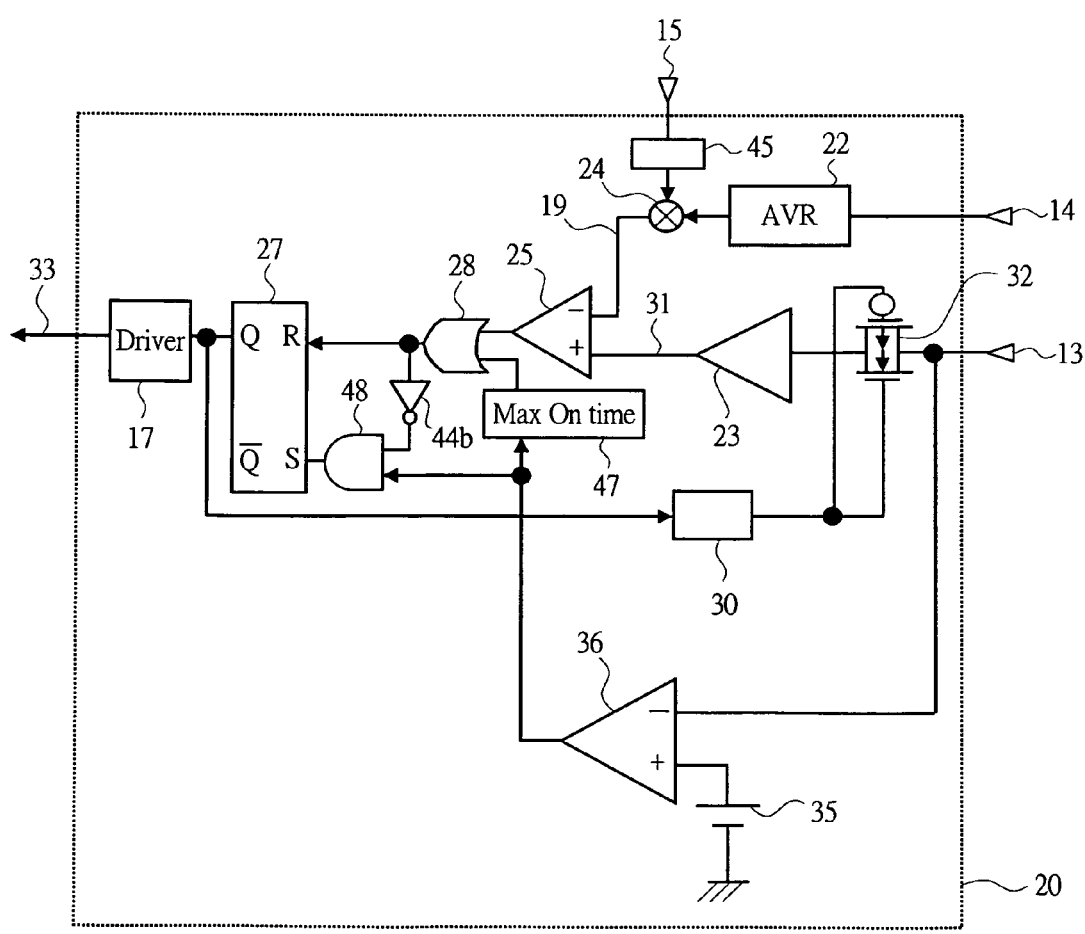
FIG. 9 is a circuit diagram showing a configuration of a control circuit of a switching power supply according to a fifth embodiment of the present invention.

Next, with reference to FIG. 1 and FIG. 9, a configuration of a switching power supply according to a fifth embodiment of the present invention will be described. FIG. 9 is a circuit diagram showing a configuration of a control circuit of the switching power supply according to the fifth embodiment of the present invention, as well as showing a circuit which performs control in critical mode.

In the switching power supply of the present embodiment, the control circuit 20 of the switching power supply according to the first embodiment shown in FIG. 1 is replaced with the control circuit 20 shown in FIG. 9.

The control circuit 20 shown in FIG. 9 has a function similar to that of the control circuit 20 of the circuit diagram shown in FIG. 1, the control circuit 20 in FIG. 9 operates in combination with the main circuit in FIG. 1 by replacing the control circuit 20 in FIG. 1 with the control circuit 20 in FIG. 9. In FIG. 9, parts and blocks having the same functions as in FIG. 1 are applied with the same reference numerals.

Inside the control circuit 20, the output voltage sense signal 14 is inputted to the output voltage regulator 22. The output of the output voltage regulator 22 is inputted to the multiplier 24. Similarly, the input voltage sense signal 15 is inputted to the multiplier 24 via the gain 45. The output of the multiplier 24 is inputted to the comparator 25 as a peak current command value 19. On the other hand, the device voltage sense signal 13 is inputted to the amplifier 23 via the analog switch 32. The output of the amplifier 23 is inputted to the comparator 25 as the current corresponding value 31.

The output of the comparator 25 is inputted to the OR circuit 28. On the other hand, the device voltage sense signal 13 is inputted to the − terminal of the comparator 36. The reference voltage 35 is connected to the + terminal of the comparator 36. The output of the comparator 36 is inputted to an AND circuit 48 and a maximum On time circuit 47. The output of the maximum On time circuit 47 is inputted to the OR circuit 28.

The output of the OR circuit 28 is inputted to the reset of the flip-flop circuit 27. Further, the output of the OR circuit 28 is inputted to the AND circuit 48 via a NOT circuit 44*b*. The output of the AND circuit 48 is inputted to the set of the flip-flop circuit 27. The Q output of the flip-flop circuit 27 is connected to the control terminal of the analog switch 32 via the delay circuit 30, as well as being inputted to the driver 17. The output of the driver 17 is outputted as a drive signal 33, and connected to the gate of the power MOSFET 8 in FIG. 1.

Figure 10:
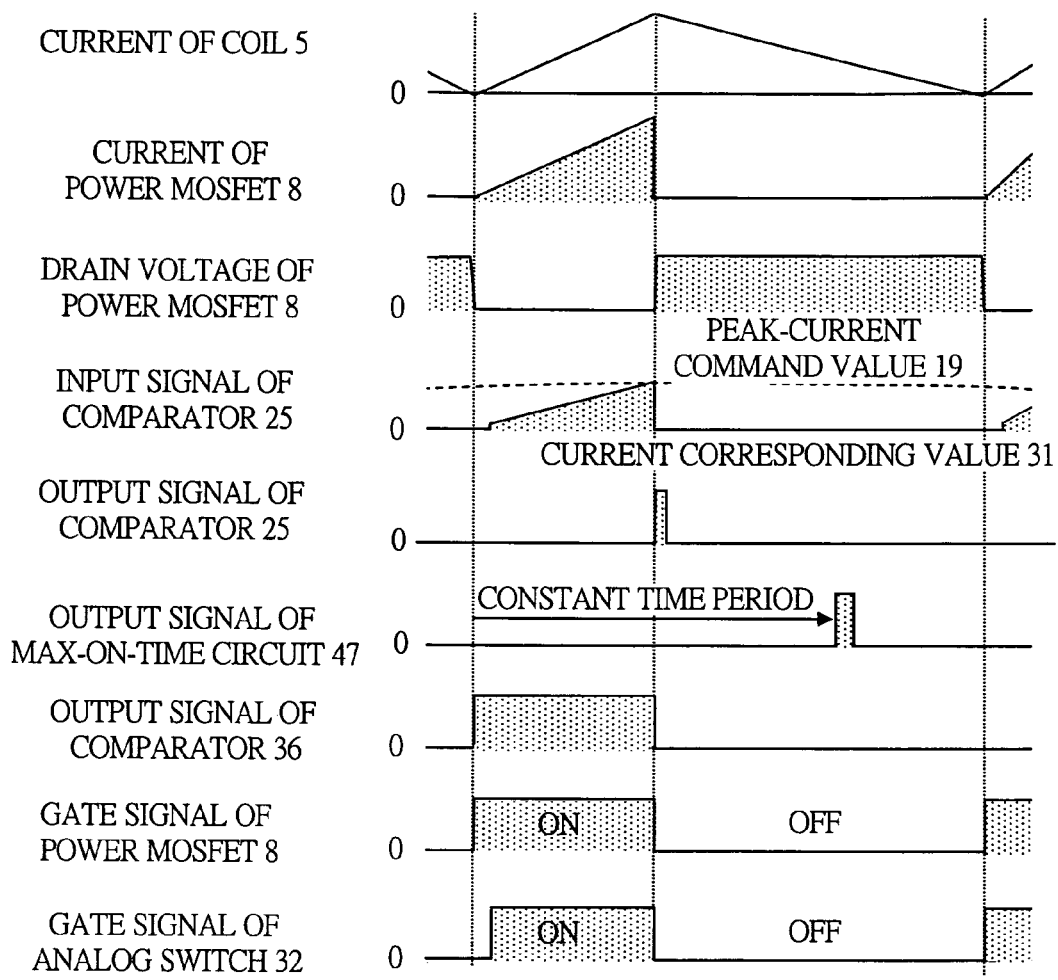
FIG. 10 is a diagram showing waveforms of respective parts of the switching power supply in operation according to the fifth embodiment of the present invention.
Figure 10:
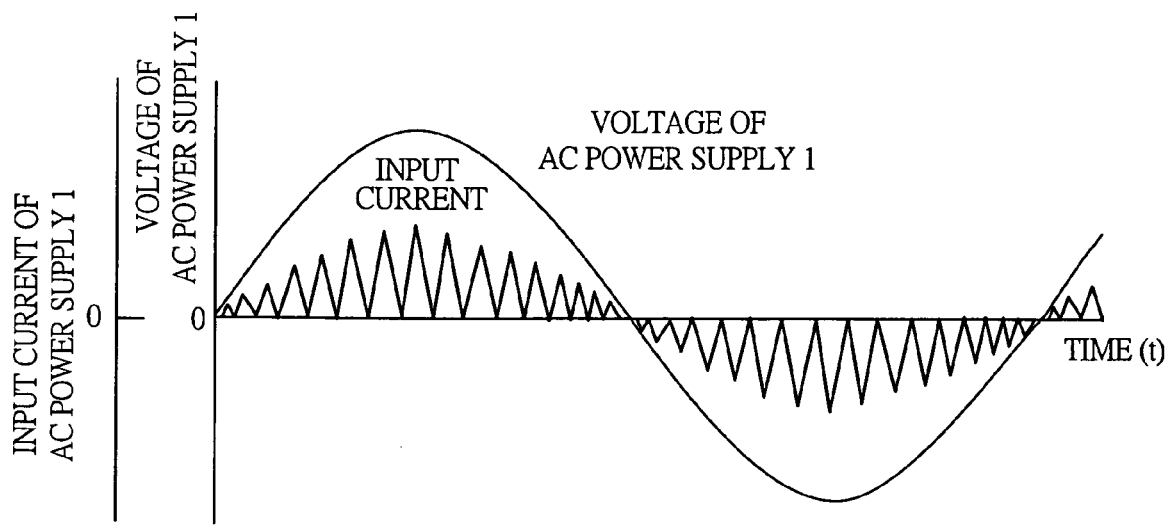

Next, with reference to FIG. 1, FIG. 9, and FIG. 10, the operation of the switching power supply according to the fifth embodiment of the present invention will be described. FIG. 10 is a diagram showing waveforms of respective portions during the operation of the switching power supply according to the fifth embodiment of the present invention.

In the present embodiment, as is the example with a conventional power factor correction (PFC) converter, a boosting operation is utilized to waveform-control the input current from AC power supply 1 to a sinusoidal waveform in the same phase as the AC power supply 1, and at the same time, the output voltage 7 is controlled to a constant voltage (for example, DC 380 V).

In the present embodiment, a current flowing in the circuit is measured without using such a shunt resistor as used in the conventional technique to perform peak current control.

The drain source voltage of the power MOSFET 8 is divided by the voltage-dividing resistors 11*c* and 11*d* and inputted to the control circuit 20 as the device sense signal 13, and then inputted to the amplifier 23 via the analog switch 32.

At this time, due to the flip-flop circuit 27 and the delay circuit 30, the timing of the gate waveform of the power MOSFET 8 and the timing of the gate waveform of the analog switch 32 become as shown in FIG. 10.

Accordingly, the analog switch 32 is also OFF when the power MOSFET 8 is OFF, and the device voltage sense signal 13 is cut. When a short amount of time set in advance by the delay circuit 30 has passed since the power MOSFET 8 turned ON, the analog switch 32 turns ON, and the cutting of the device voltage sense signal 13 is released. Providing the short amount of time by the delay circuit 30 is for preventing the current detecting system from receiving noise caused by di/dt at the turn-on time of the power MOSFET 8.

As the result, when the ON resistance of the power MOSFET 8 is represented by Ron, the voltage-dividing resistors 11*c* and 11*d* are represented by R11*c*, R11*d*, respectively, a current flowing in the power MOSFET 8 is represented by IL, and the device voltage sense signal 13 is represented by Vsns, Vsns is a voltage represented by the following equation.

$$Vsns = IL \times Ron \times R11d / (R11c + R11d)$$

Vsns is amplified by the amplifier 23, so that the quantity of state proportional to the flowing current IL can be obtained as a current corresponding value 31.

In FIG. 10, the correlation among the current of the coil 5, the current of the power MOSFET 8 and the current corresponding value 31 is shown. Though the current corresponding value 31 is cut with respect to the current of the power MOSFET 8 at the turn-on time by the short amount of time set by the delay circuit 30, the current corresponding value 31 thereafter has a proportional waveform. On the other hand, the output voltage 7 is taken into the control circuit 20 as the output voltage sense signal 14, subjected to error amplification by the output voltage regulator 22 with respect to a voltage instruction value which the output voltage regulator 22 has inside, and outputted to the multiplier 24.

Further, the input voltage 4 is taken into the control circuit 20 as the input voltage sense signal 15, the gain 45 is added to the input voltage 4 and the input voltage 4 is inputted to the multiplier 24, the input voltage 4 is multiplied by the output of the output voltage regulator 22, and this result becomes a peak current command value 19.

The peak current command value 19 has a waveform obtained by full-wave-rectifying a sinusoidal waveform of the AC power supply 1, and the crest value thereof depends on the output of the output voltage regulator 22. The peak current command value 19 is inputted to the comparator 25 to be compared with the current corresponding value 31. In FIG. 10, a relation between the peak current command value 19 and the current corresponding value 31 is shown. When the current corresponding value 31 increases up to the same value as the peak current command value 19 indicated by the broken line, the output of the comparator 25 is inverted from Low which is the previous state to High. This signal is inputted to the OR circuit 28 in FIG. 9.

A signal from the maximum On time circuit 47 is also inputted to the OR circuit 28. As shown in FIG. 10, the maximum On time circuit 47 outputs a pulse after a predetermined constant time period reckoned from a time point when the power MOSFET 8 turns on. The earlier pulse of the output pulse of the maximum On time circuit 47 and the output pulse of the comparator 25 becomes effective, and the timing of the earlier pulse is inputted to the reset of the flip-flop circuit 27.

In the steady state, the output pulse of the comparator 25 is outputted earlier than the output pulse of the maximum On time circuit 47. As a result, a reset signal of the flip-flop circuit 27 enters at the time point when the current corresponding value 31 corresponds to the peak current command value 19, and the Q output of the flip-flop circuit 27 turns to Low. That is, the drive signal 33 of the power MOSFET 8 turns off, and the power MOSFET 8 turns off.

Since the delay circuit 30 performs delay only at the change from High to Low, and does not perform delay at the change from Low to High, the gate of the analog switch 32 turns to High at the same time as the Q output of the flip-flop circuit 27 turns to Low, and the analog switch 32 turns off. The power MOSFET 8 turns off delayed after the analog switch 32 turns off because the driver 17 is interposed.

As a result, the amplifier 23 is never affected by surging of the drain voltage at the turn-off time of the power MOSFET 8.

When the power MOSFET 8 turns off, the current of the coil 5 is monotonically reduced to zero, as shown in FIG. 10. When the current of the coil 5 reaches zero, the boost diode 6 (see FIG. 1) turns off, and the drain voltage of the power MOSFET 8 to which the output voltage 7 had been previously applied is reduced to zero as shown in FIG. 10.

This voltage change causes the output of the comparator 36 to be inverted from Low which is the previous state to High. This High signal is also inputted to the maximum On time circuit 47 as well as being inputted to the AND circuit 48. In the maximum On time circuit 47, this signal leads a pulse waveform to be outputted after elapsing of a predetermined time period. This becomes the maximum On width of the power MOSFET 8. When the output of the comparator 36 is inverted from Low to High, the output of the OR circuit 28 is at the Low level, and the output of the AND circuit 48 reaches the High level according to the change of Low to High of the comparator 36.

Then, the flip-flop circuit 27 is set, and the Q output turns from Low to High. The power MOSFET 8 turns on according to the set of the flip-flop circuit 27. As a result, the power MOSFET 8 operates in a so-called critical current mode where the power MOSFET 8 turns on at the time point when the current of the coil 5 is lowered to zero, and turns off at the peak current of the crest value depending on the output voltage regulator 22.

The current of the coil 5 has a saw-tooth wave which becomes the maximum value when the turn-off of the power MOSFET 8 and becomes the minimum value when thee turn-on of the power MOSFET 8 as shown in FIG. 10, and the rough shape of the wave is a shape similar to the waveform obtained by rectifying the voltage waveform of the AC power supply 1. The present embodiment also achieves effects similar to those of the other embodiments.

Sixth Embodiment

Figure 11:
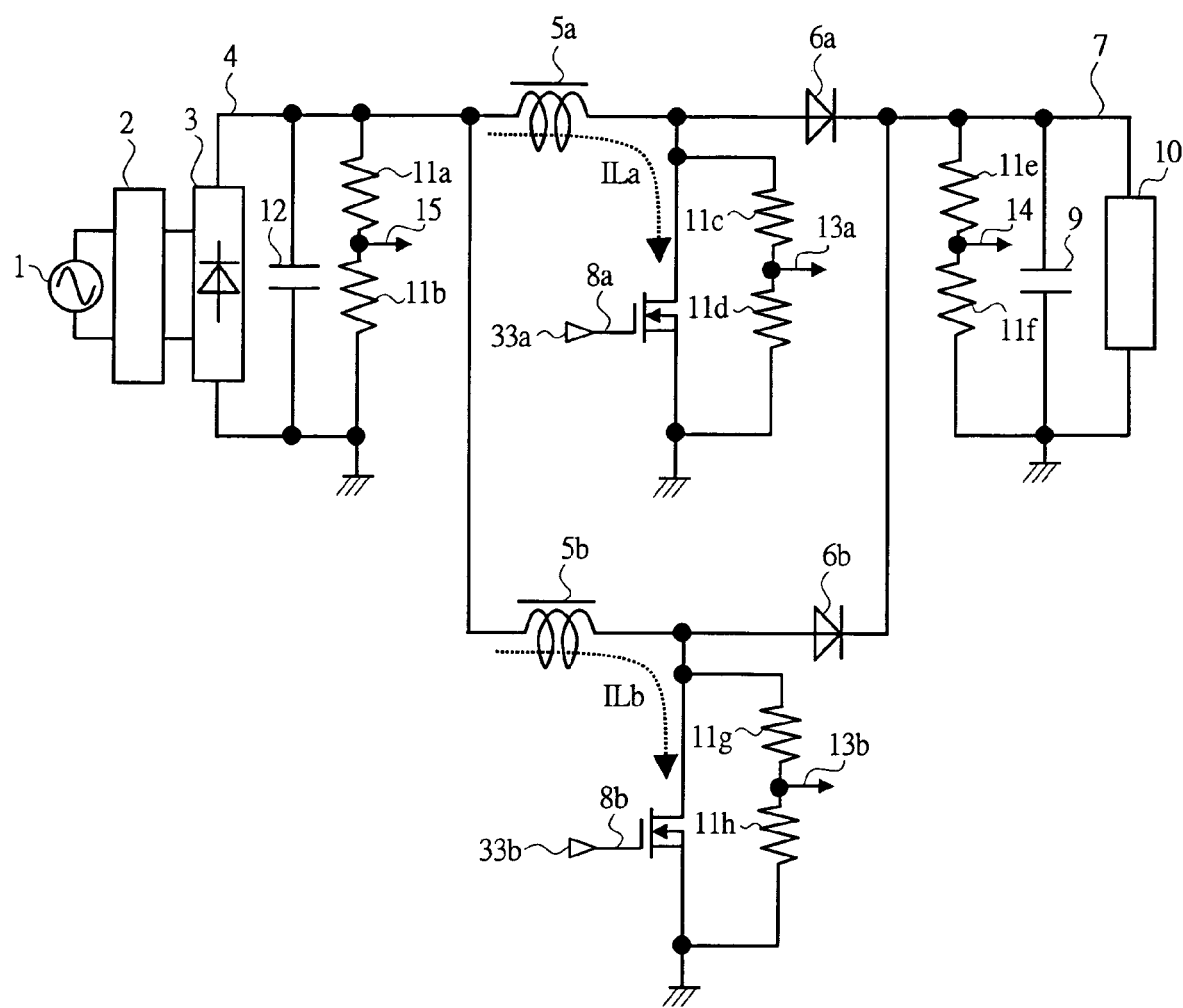
FIG. 11 is a diagram showing a main circuit of a switching power supply according to a sixth embodiment of the present invention.
Figure 12:
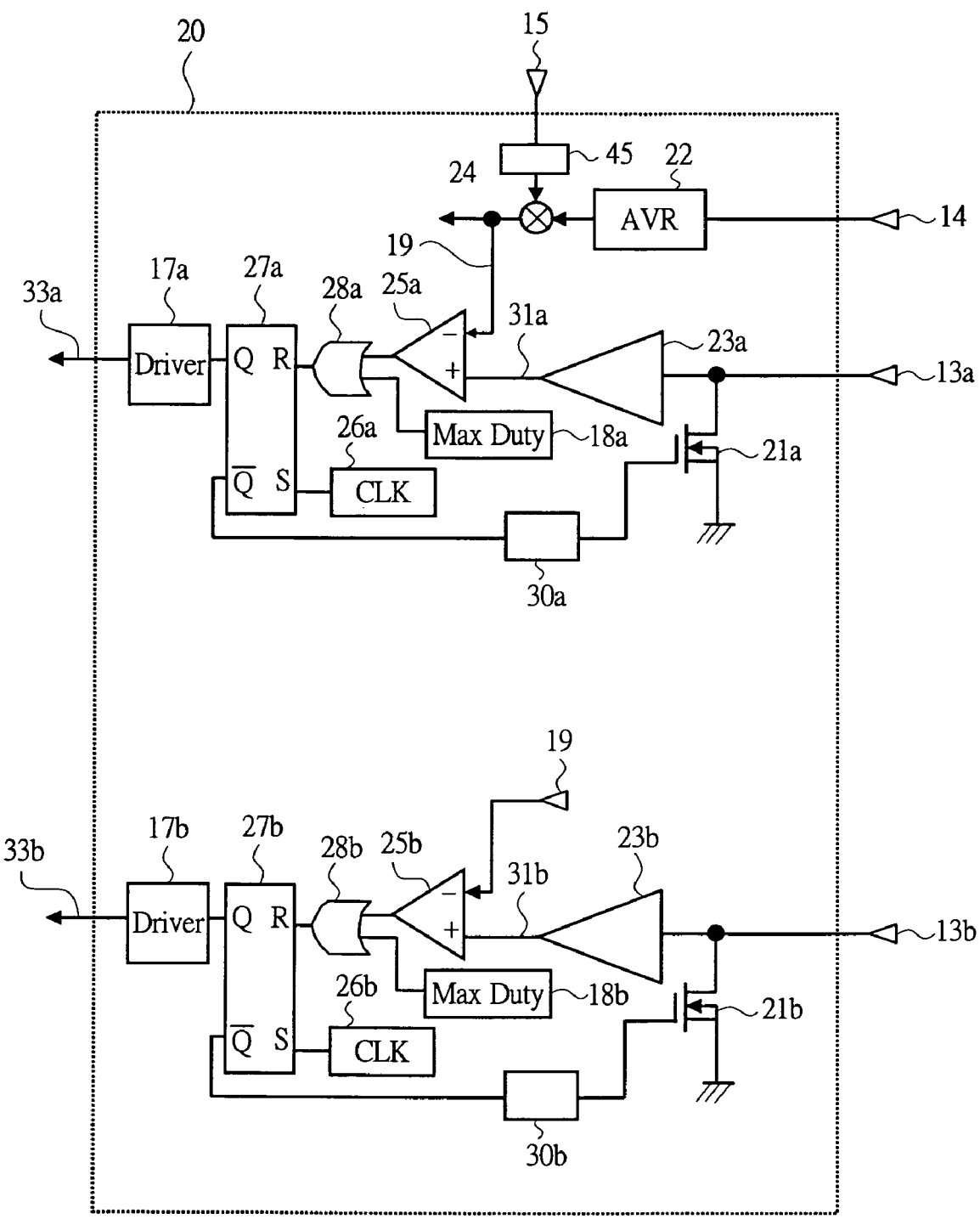
FIG. 12 is a diagram showing a control circuit of the switching power supply according to the sixth embodiment of the present invention.

With reference to FIG. 11 and FIG. 12, a configuration of a switching power supply according to a sixth embodiment of the present invention will be described. FIG. 11 is a circuit diagram showing a main circuit of the switching power supply according to the sixth embodiment of the present invention. FIG. 12 is a circuit diagram showing a control circuit of the switching power supply according to the sixth embodiment of the present invention. And, FIG. 11 and FIG. 12 show circuit diagrams of a power factor correction converter with a two-phase interleaved configuration as a switching power supply.

The circuit diagrams shown in FIG. 11 and FIG. 12 are made to two-phase obtained by expanding the circuit of the first embodiment shown in FIG. 1 as a base, and operations of the respective phases are as described in the first embodiment.

In FIG. 11, the difference from the configuration in FIG. 1 is as follows.

Particularly, a series body of a coil 5$a$ and a power MOSFET 8$a$ and a series body of a coil 5$b$ and a power MOSFET 8$b$ are connected to the capacitor 12 in parallel with each other. A boost diode 6$a$ is connected between the drain of the power MOSFET 8$a$ and the smoothing capacitor 9, and a boost diode 6$b$ is connected between the drain of the power MOSFET 8$b$ and the smoothing capacitor 9.

The voltage-dividing resistors 11$c$ and 11$d$ are connected between the drain and source of the power MOSFET 8$a$, and a device voltage sense signal 13$a$ is outputted from the middle point of the voltage-dividing resistors 11$c$ and 11$d$. Voltage-dividing resistors 11$g$ and 11$h$ are connected between the drain and source of the power MOSFET 8$b$, and a device voltage sense signal 13$b$ is outputted from the middle point between the voltage-dividing resistors 11$g$ and 11$h$.

In FIG. 12, the difference from FIG. 1 is as follows.

In FIG. 12, the device voltage sense signal 13$a$ is connected to a switch 21$a$, as well as being inputted to an amplifier 23$a$. The device voltage sense signal 13$b$ is connected to a switch 21$b$, as well as being inputted to an amplifier 23$b$. The output of the amplifier 23$a$ is inputted to a comparator 25$a$ as a current corresponding value 31$a$.

The output of the amplifier 23$b$ is inputted to a comparator 25$b$ as a current corresponding value 31$b$. The peak current command value 19 is inputted to the comparators 25$a$ and 25$b$. The output of the comparator 25$a$ is inputted to an OR circuit 28$a$. The output of the comparator 25$b$ is inputted to an OR circuit 28$b$.

Further, the output of a maximum Duty circuit 18$a$ is inputted to the OR circuit 28$a$. The output of a maximum Duty circuit 18$b$ is inputted to the OR circuit 28$b$. The output of the OR circuit 28$a$ is inputted to the reset of a flip-flop circuit 27$a$. The output of the OR circuit 28$b$ is inputted to the reset of a flip-flop circuit 27$b$. A clock 26$a$ is inputted to the set of the flip-flop circuit 27$a$. A clock 26$b$ is inputted to the set of the flip-flop circuit 27$b$. The Q output of the flip-flop circuit 27$a$ is connected to a driver 17$a$. The Q output of the flip-flop circuit 27$b$ is connected to a driver 17$b$.

The output of the driver 17$a$ is connected to the gate of the power MOSFET 8$a$ as a drive signal 33$a$. The output of the driver 17$b$ is connected to the gate of the power MOSFET 8$b$ as a drive signal 33$b$. The Q bar output of the flip-flop circuit 27$a$ is connected to the gate of the switch 21$a$ via a delay circuit 30$a$. The Q bar output of the flip-flop circuit 27$b$ is connected to the gate of the switch 21$b$ via a delay circuit 30$b$.

The individual operation of the two-phase switching power supply of the present embodiment is similar to the operation described in the first embodiment.

In the present embodiment, the pulses of the clock 26$a$ and the clock 26$b$ have the same frequency and a phase difference of 180 degrees. Similarly, in the maximum Duty circuits 18a and 18b, the output pulses have a phase difference of 180 degrees.

According to this fact, the respective phases of the two-phase PFC converter have a common current command value which means that the flowing currents of the coil 5a and the coil 5b are the peak current command value 19 and an interleave operation with a phase difference of 180 degrees is performed, the sum of the current of the coil 5a and the current of the coil 5b has a smooth waveform where respective ripples are cancelled.

By inputting this smooth current waveform from the AC power supply 1, it becomes possible to downsize the input filter shown in FIG. 1.

Since the present embodiment also has the effects according to using no shunt resistor, a power factor correction converter which achieves cost reduction, low noise, and reduction in number of parts as compared to a conventional one can be provided.

Further, in the present embodiment, although the example of a popular two-phase interleave has been shown, the present invention is not limited to this, but also be developed to three or more phase interleaved configuration, and achieves similar effects.

Note that, as an operation of the interleave-system power factor correction converter described in the present embodiment, a current continuous mode, a current critical mode, and a current intermittent (discontinuous) mode can be considered. While FIG. 12 shows a control circuit in the current continuous mode, the present embodiment can change the control circuit to accommodate the current critical mode and the current intermittent (discontinuous) mode.

Seventh Embodiment

Figure 13:
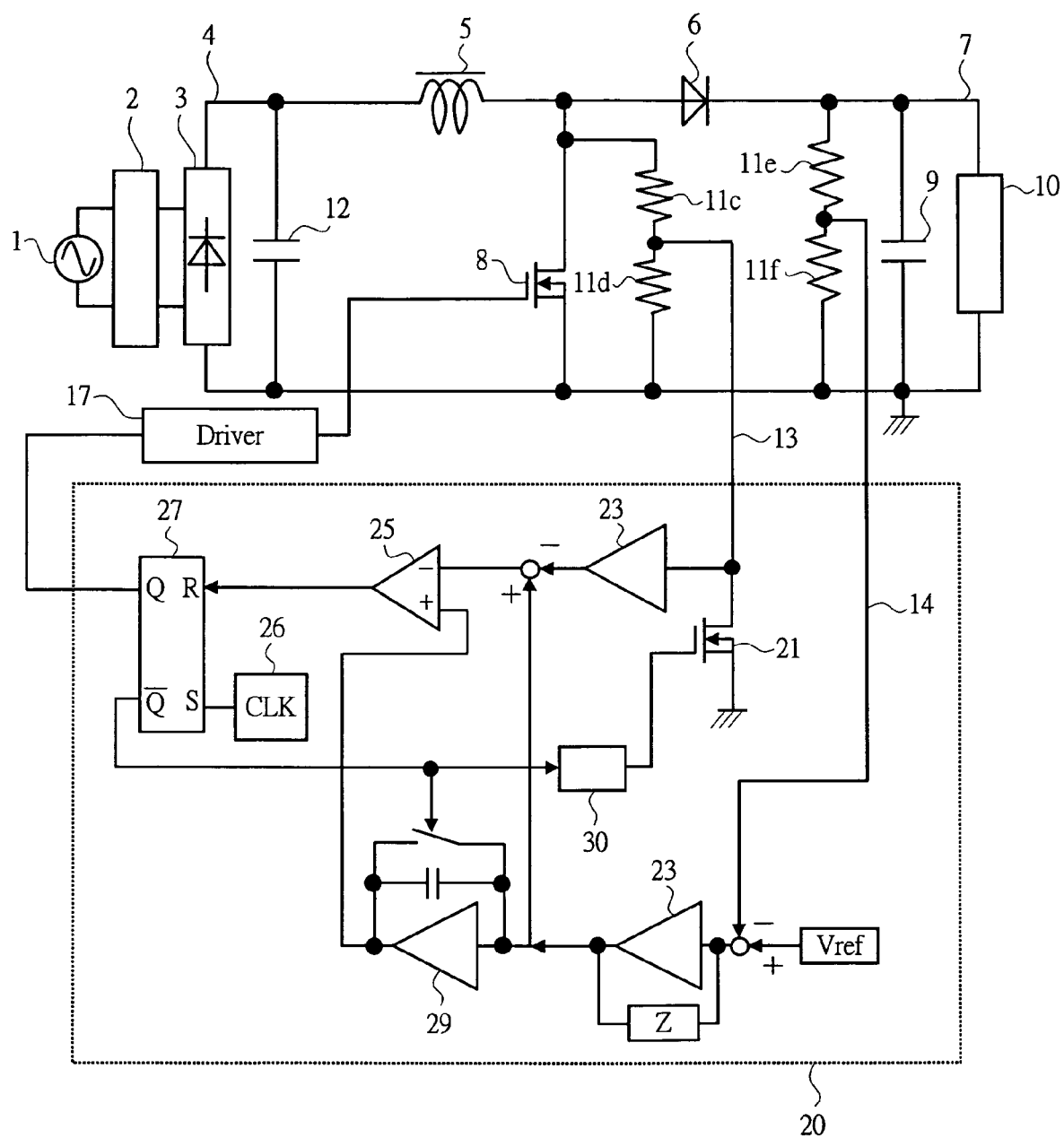
FIG. 13 is a circuit diagram showing a configuration of a switching power supply according to a seventh embodiment of the present invention.

With reference to FIG. 13, a configuration of a switching power supply according to a seventh embodiment of the present invention will be described. FIG. 13 is a circuit diagram showing the configuration of the switching power supply according to the seventh embodiment of the present invention, as well as showing a circuit diagram of a power factor correction converter with an input-voltage-sensorless configuration.

In FIG. 13, the AC power supply 1 becomes the input voltage 4 via the input filter 2 and the rectifier 3, thereby making a full-wave rectification waveform. Since the capacitance of the capacitor 12 is relatively small, a sinusoidal waveform is hardly smoothed. A series body of the coil 5 and the power MOSFET 8 is connected to the direct current side of the rectifier 3.

A series body of the boost diode 6 and the smoothing capacitor 9 and the voltage-dividing resistors 11e, 11d are connected between the drain and source of the power MOSFET 8. As well as the voltage-dividing resistors 11e, 11f, the load 10 is connected to both sides of the smoothing capacitor 9. The voltage of the smoothing capacitor 9 is called output voltage 7.

The device voltage sense signal 13 is outputted from the middle point of the voltage-dividing resistors 11c and 11d and inputted to the control circuit 20. The output voltage sense signal 14 is outputted from the middle point of the voltage-dividing resistors 11e and 11f, and inputted to the control circuit 20.

Inside the control circuit 20, the output voltage sense signal 14 is subtracted from the output voltage instruction value Vref, and the error obtained by the subtraction is inputted to the amplifier 23 and subjected to error amplification. The output is inputted to the reset integrator 29. On the other hand, the device voltage sense signal 13 is inputted to the amplifier 23, as well as being grounded via the switch 21.

The output of the amplifier 23 is subtracted from the output value of the amplifier 23 and inputted to the − terminal of the comparator 25. The output of the reset integrator 29 is inputted to the + terminal of the comparator 25 to be compared with the input value of the − terminal. The output of the comparator 25 is inputted to the reset of the flip-flop circuit 27. The clock 26 is inputted to the set of the flip-flop circuit 27. The Q output of the flip-flop circuit 27 is connected to the driver 17 outside the control circuit 20. The output of the driver 17 is connected to the gate of the power MOSFET 8. The Q bar output of the flip-flop circuit 27 is connected to the gate of the switch 21 via the delay circuit 30, as well as being connected to the reset switch of the reset integrator 29.

In this circuit configuration, according to the change of the output voltage sense signal 14 and the current detecting value (output value of the amplifier 23), control of changing the on-pulse width of the power MOSFET 8 for each cycle is performed. As a result, even when taking-in of the input voltage waveform is omitted and the current-detecting resistor is omitted, the current of the coil 5 can have a substantially sinusoidal waveform synchronous with the input voltage.

Also in the present embodiment, an effect to the omission of the current-detecting resistor, which is similar to the effect of the other embodiments, can be obtained.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is applicable to any electric equipment, air-conditioning equipment, electric appliance, and information equipment such as a personal computer and a server, into which a commercial AC power is inputted to operate.

What is claimed is:

1. A switching power supply comprising:
   rectifying means for rectifying an AC power supply;
   boosting means including a switching device for boosting an output of the rectifying means;
   smoothing means for smoothing an output of the boosting means;
   first voltage detecting means for detecting a voltage between main terminals of the switching device as a voltage obtained by dividing the voltage between the main terminals;
   selecting means for selecting only the voltage by which the switching device is in an on-state among voltages detected by the first voltage detecting means, and setting voltages other than the selected voltage to a GND potential;
   amplifying means for amplifying the voltage selected by the selecting means and outputting the same as a current corresponding value of a current to flow in the switching device;
   second voltage detecting means for detecting an output voltage of the smoothing means; and
   driving means which form a pulse signal based on the current corresponding value and the output voltage, for driving the switching device by the pulse signal,
   wherein a GND potential of a control circuit that includes the selecting means, the amplifying means, and the driving means is the same potential as a low potential side of the switching device.

2. The switching power supply according to claim 1, wherein the selecting means, the amplifying means, and the driving means are mounted in one integrated circuit.

3. The switching power supply according to claim 1, wherein a control system comprising the selecting means, the amplifying means, and the driving means uses the output voltage for a major loop, and uses the current corresponding value for a minor loop.

4. The switching power supply according to claim 1, wherein a low potential side of the rectifying means, a low potential side of the switching device, and a low potential side of the smoothing means are at the same potential.

5. The switching power supply according to claim 1 further comprising short circuit detecting means for detecting short-circuit of the switching device based on the voltage detected by the first voltage detecting means.

6. A switching power supply comprising:
rectifying means for rectifying an AC power supply;
a plurality of boosting means including switching devices for boosting an output of rectifying means;
smoothing means for smoothing outputs of the plurality of boosting means;
a plurality of first voltage detecting means for detecting a voltage between main terminals of the respective switching devices of the plurality of boosting means as a voltage obtained by dividing the voltage between the main terminals;
a plurality of selecting means for selecting only a voltage by which the switching device to be detected is in an on-state from respective voltages detected by the plurality of first voltage detecting means, and setting voltages other than the selected voltage to a GND potential;
a plurality of amplifying means for amplifying the respective voltages selected by the plurality of selecting means and outputting the voltages as current corresponding values corresponding to currents flowing in the switching devices;
second voltage detecting means for detecting an output voltage of the smoothing means; and
driving means which form pulse signals to the plurality of switching devices based on the current corresponding value and the output voltage, for driving the plurality of switching devices by the pulse signals,
wherein a GND potential of a control circuit that includes the selecting means, the amplifying means, and the driving means is the same potential as a low potential side of the switching device.

* * * * *